UNITED STATES PATENT OFFICE.

CHARLES E. WAIT, OF KNOXVILLE, TENNESSEE.

BREAD AND PROCESS OF MAKING SAME.

No. 882,852.　　　　Specification of Letters Patent.　　Patented March 24, 1908.

Application filed March 24, 1905. Serial No. 251,865.

*To all whom it may concern:*

Be it known that I, CHARLES E. WAIT, a resident of Knoxville, Tennessee, have invented a new and useful Bread Composition, which invention is fully set forth in the following specification.

This invention relates to food products for man, and more particularly to products comprising a cooked mixture of dehulled cottonseed meal and cereal flour partly freed from oil, and by way of example of such products may be mentioned bread, biscuit, batter-cakes, short-bread or pastry, cakes, gingerbread, dough-nuts, hoe-cake, pone, crackers, breakfast food, and like preparations.

The invention will be described by way of illustration in reference to bread, but it is to be understood that the advantages of the invention also pertain to other cooked products containing dehulled cotton-seed meal and cereal flour as their principal ingredients.

One of the deficiencies of bread as heretofore prepared is that it is lacking to a greater or less extent in the amount of proteids necessary to constitute an ideal food, meat being employed to supply this deficiency.

One object of the present invention is to provide a bread which shall be rich in protein, while at the same time supplying the carbo-hydrates, fats, phosphates, and other elements in sufficient quantities to make a scientifically ideal food.

With this object in view, the invention consists in the process hereinafter described of making bread, and in the bread resulting from that process.

In making bread according to the process of the present invention, dehulled cotton-seed meal from which the oil has in part or in whole been removed, is mixed with a cereal meal or flour, or a plurality of these, in connection with such other ingredients as the particular kind of bread may require, the whole being formed into a batter or dough and then cooked. The cotton-seed meal is rich in highly digestible proteids and phosphates, and the cereal meal or flour supplies the necessary amount of hydrocarbons, fat and other elements. The particular proportions of cotton-seed meal and cereal meal or flour will depend upon the particular circumstances of each case, such as the kind of cereal meal or flour employed, the taste of the consumer, etc. In making bread from wheat flour and cotton-seed meal, the following has been found to produce excellent results. Take of wheat flour by weight two parts, cotton-seed meal carefully sifted or bolted, one part, salt, yeast and a liquid, as water or milk, in sufficient quantity to form the whole into a dough, which may then be kneaded, raised and baked in the usual or any suitable manner. This gives a light, palatable bread of good color, rich in proteids and phosphates, due to the presence of the cotton-seed meal, and possessing all the other elements of an excellent wheat-flour bread.

Another formula which has given most satisfactory results is as follows: Take of buckwheat flour two parts by weight, sifted or bolted cotton-seed meal, one part, sour milk, bicarbonate of soda and salt in sufficient quantity, and form the whole into a batter of proper consistency, and bake on a cake griddle in the usual way. Cakes made in this manner are particularly appetizing and highly nutritious.

In making those kinds of bread which are "raised" or lightened, the usual ingredient for liberating carbonic acid gas in the mixture is employed, as by the use of a suitable acid with bicarbonate of soda, or a suitable yeast may be used, as in the well-known methods of bread-making. On the other hand, these ingredients are omitted in making those forms of bread in which "raising" or lightening is not required, as in pie-crust, hoe-cake, etc. Thus, in making hoe-cake, a mixture of two parts by weight of cotton-seed meal, with three parts of corn meal to which is added a sufficient quantity of salt and water or milk, is used, no raising substance like yeast or bicarbonate of soda and an acid being employed.

The proportions of cotton-seed meal and cereal flour or meal, given above, have been found very satisfactory, but the proportions may be and have been varied either by increasing or decreasing the proportion of cotton-seed meal employed, with most excellent results.

Carefully conducted laboratory experiments have demonstrated that bread made according to the present invention is readily digested and assimilated, and that the system is nourished and built up thereby in a manner similar to that of an ordinary bread and meat diet. This is especially true of the proteids contained in the bread, the proteids of cotton-seed meal being more readily soluble than those of cereals, and hence more easily digested. In addition to this, the high percentage of phosphates in cotton-seed meal makes the bread of this invention highly valuable in building up the bony structures of the human system.

What is claimed is:

1. A food product for man comprising a cooked mixture of dehulled cotton-seed meal or flour free from part of its oil, and a cereal flour, substantially as described.

2. A food product for man comprising a cooked mixture of de-hulled cotton-seed meal or flour free from part of its oil, a cereal flour, and a fatty substance in normal amount for shortening, substantially as described.

3. A food product for man comprising a cooked mixture of dehulled cotton-seed meal free from part of its oil, and corn-meal or flour, substantially as described.

In testimony whereof I have signed this specification in the presence of two subscribing witnesses.

CHARLES E. WAIT.

Witnesses:
 CHARLES H. SMITH,
 JAS. H. WELEKER.